Dec. 20, 1927.
R. B. CAMPBELL
TAPE SOLDER
Filed June 12, 1922
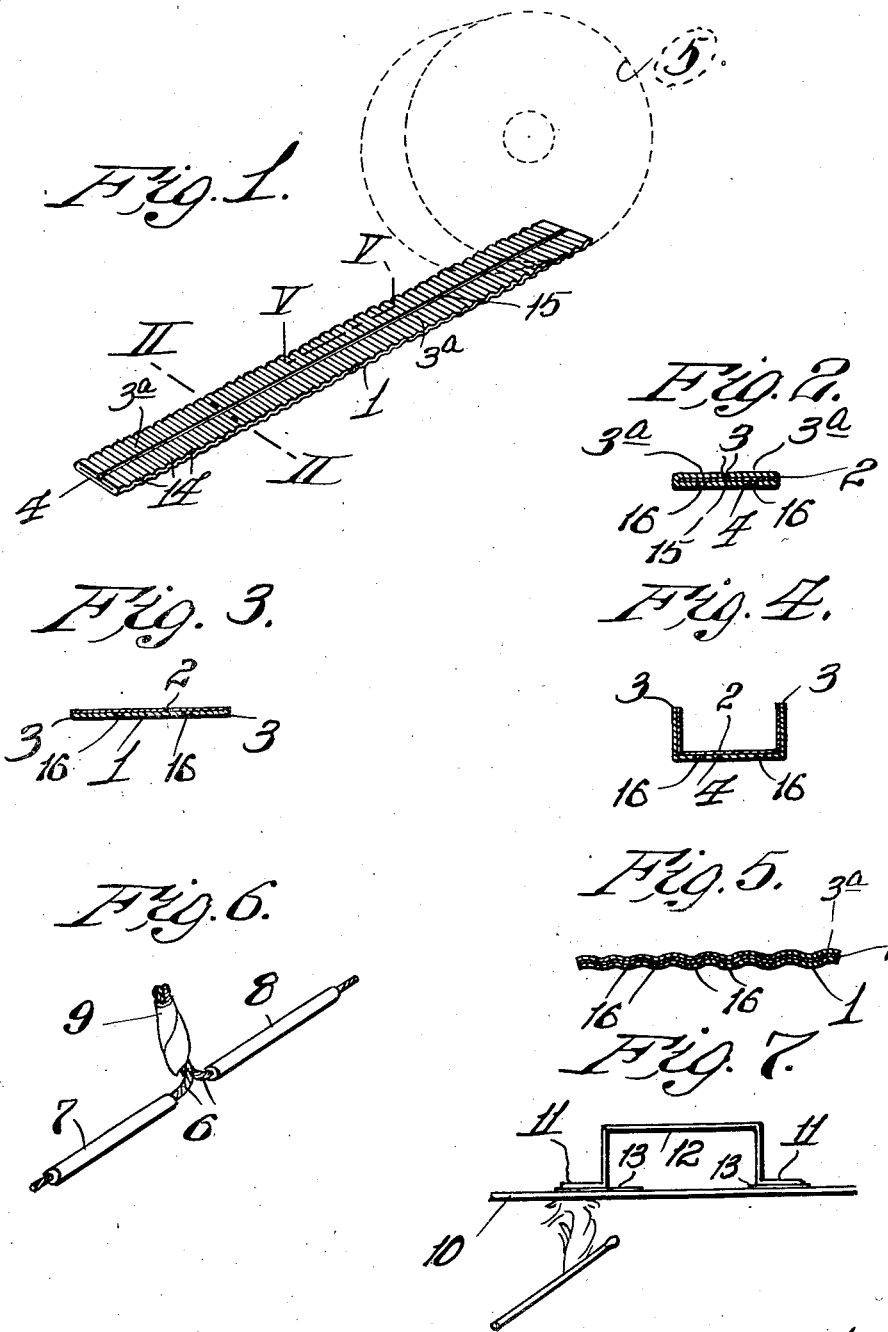

Patented Dec. 20, 1927.

1,653,546

UNITED STATES PATENT OFFICE.

RALPH B. CAMPBELL, OF ST. LOUIS, MISSOURI.

TAPE SOLDER.

Application filed June 12, 1922. Serial No. 567,588.

This invention relates to an improvement in soldering materials and has for its primary object the purpose of providing a material which is relatively thin and flat, so that it can be readily wrapped around portions which are to be joined or united such as the operation of securing the ends of a pair of electric circuit wires together.

Another object of the invention is to provide an improved soldering material having a low melting point so that the same can be fused by the heat from a match flame.

A further object of the invention is to provide an improved soldering material in the form of a tape or ribbon which is capable of being severed by tearing so that portions thereof can be torn off with ease ready for instant use.

A still further object of the invention is in providing improved solder from material such as tin-foil which is folded and is provided with a flux content between the folds.

Other and further objects will appear in the specification and be specifically pointed out in the appended claims, reference being had to the accompanying drawings, exemplifying the invention, and in which—

Figure 1 is a perspective view of a strip or tape length of this improved soldering tape.

Figure 2 is a transverse section taken on the line II—II of Fig. 1.

Figure 3 is a transverse sectional view taken through the tin-foil before it has been folded for the purpose of showing the construction of this improved soldering tape.

Figure 4 is a transverse section taken through the tin-foil body showing a manner of folding the body so as to enclose the flux content between the folds of the body.

Figure 5 is an enlarged fragmentary longitudinal section taken on the line V—V of Fig. 1.

Figure 6 is a view showing the application of this improved tape solder to the ends of circuit wires for the purpose of soldering and uniting the ends.

Figure 7 is a view showing the application of securing a pair of relatively flat bodies together.

Referring by numerals to the accompanying drawings, this improved tape solder is comprised of a body of relatively thin metal sheet such as tin-foil, designated as 1, which is cut or formed into a relatively long strip, and to one side of said body or strip is provided a thin layer of a non-corrosive flux content 2 which is used to expedite the fusing of the tin-foil body.

After the application of the flux content which is in the form of a liquid or paste, the opposing longitudinal side edges 3 of the body 1 are folded upwardly and downwardly as designated in Figs. 2 and 4 thereby forming folded layers $3^a$ upon the central portion 4 and encasing the flux content so that said flux content can be retained therein during the handling of this improved tape solder.

This improved tape solder may be provided in strip or tape lengths, or can be spooled as designated by dotted lines 5 in Fig. 1.

On account of this improved tape solder being constructed of tin-foil or other comparatively thin sheet metal which is more in the form of a sheeted leaf, portions of the tape can be readily torn or cut from a strip length or spool and in the application of the solder tape, if it is desired to unite the ends 6 of wire length 7 and 8, as shown in Fig. 6, said wire ends are first scraped as is ordinary for the purpose of freeing them of corrosion, then a portion of solder tape is wrapped around said wire ends as designated at 9, and a match is then ignited and the flame thereof disposed so that the heat from the flame will engage the wrapped portion 9, and within a short space of time the action of the heat from the match flame will fuse the wrapped portion of tape which the melted tin-foil will run between the wire interstices.

In carrying out the operation just described, on account of this improved solder being in tape or ribbon form, the wire end portions to be soldered are insulated against sooting from the match flame by the wrapped portion of tape or ribbon thereby providing a thoroughly soldered joint. In the use of the present day type of stick solder which is held against the part being repaired, soot accumulation is formed on the part from the heating flame thereby forming an insulation which prevents the firmly adhering of the solder.

In the operation of applying this improved tape solder to flat surfaces which are to be secured to one another, Fig. 7 discloses a flat surface 10 to which the flat portions 11 of the handle 12 are to be secured and in which a portion of the solder tape as designated at 13 is engaged between the flat portion 10 and respectively portions 11 of the handle 12. In this instance the flame of the match is engaged against one of the flat portions such as 10 and beneath the solder tape portion 13, the handle 12 of course be held firmly against the soldering tape and flat portion 10.

For retaining a maximum volume of flux content in equal distribution within the folds of this improved tape or ribbon solder, corrugations designated as 14 in Figs. 1 and 5 are provided in the solder strip. This is for the purpose of preventing the flux content from displacement within a given area of tape length during the handling thereof or lapse of time during storage.

From an inspection of Figs. 1 and 2, it is to be noted that a gap 15 is provided between the edges 3 of the folds 3ª, said gap allowing for the expulsion of portions of the flux from said folds when the tape is applied with force to the part being repaired, such as by wrapping or otherwise, whereas the oppositely disposed side of the tape solder is provided with a plurality of perforations 16 so that portions of the flux can ooze through said perforations onto the work being repaired or to the outside of the soldering tape during wrapping or applying thereof. This expelling of portions of the flux onto the work or to the outside of the tape is for the purpose of hurrying the fusing action, as when the flame of the heating element engages the flux and a portion of the tape, fusing or melting of the metallic foil of the tape commences immediately.

What I claim is:—

1. A soldering material capable of being torn and made in the form of a strip or ribbon comprising a pair of mounted together metallic layers having a flux content arranged therebetween, one of said layers being perforated for exposing the flux content.

2. A soldering material comprising a body of folded perforated tin-foil made in the form of a strip or ribbon and bearing a flux content between the folds, said perforations exposing the flux content.

3. A soldering material made in the form of a strip or ribbon comprising a body of tin-foil which is folded upon itself in a manner wherein the adjacent meeting edges of the folded tin-foil are arranged intermediate of the width of the strip, and a flux content arranged between the folds, said meeting edges of the folded tin-foil providing a gap for exposing the flux content.

RALPH B. CAMPBELL.